June 4, 1957 G. E. FRANCK Re. 24,325
TUBE FLARING TOOL
Original Filed Jan. 19, 1950
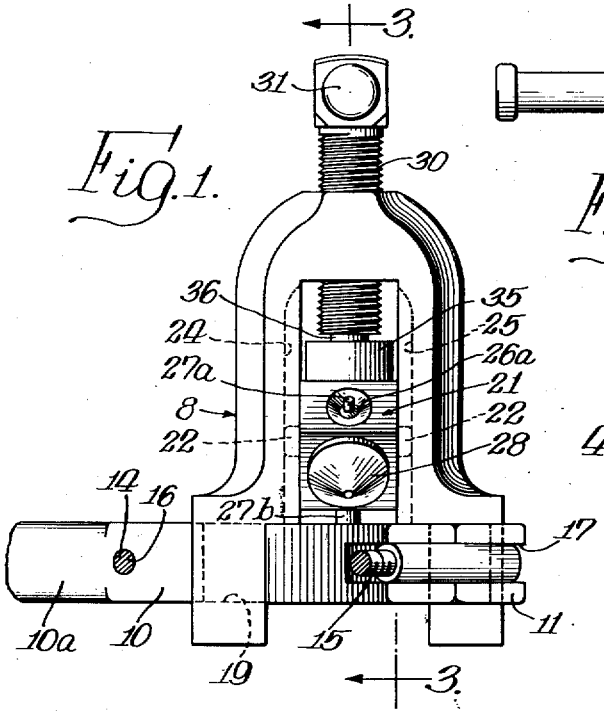
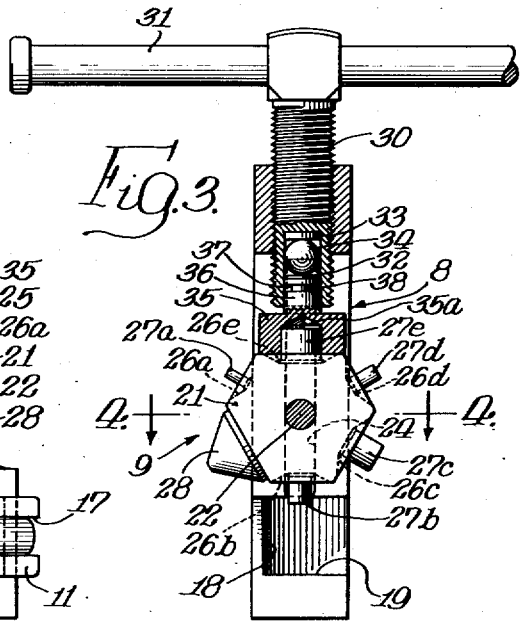
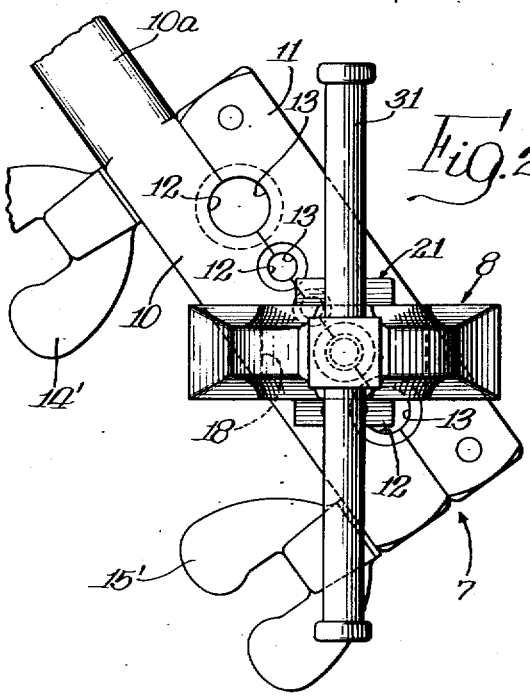
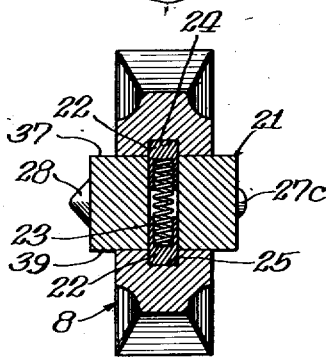
INVENTOR.
George E. Franck,
BY
Schroeder, Mueller,
Hofgren & Beachy
Attys.

United States Patent Office

Re. 24,325
Reissued June 4, 1957

24,325

TUBE FLARING TOOL

George E. Franck, Riverside, Ill., assignor to Imperial Brass Manufacturing Company, a corporation of Illinois Original No. 2,662,574, dated December 15, 1953, Serial No. 139,331, January 19, 1950. Application for reissue April 22, 1954, Serial No. 425,063

8 Claims. (Cl. 153—79)

Matter enclosed in heavy brackets [ ] appears in the original patent but forms no part of this reissue specification; matter printed in italics indicates the additions made by reissue.

The invention relates generally to a tube working tool and more particularly to a tool for forming a double flare on tubing.

A general object of the invention is to provide a new and improved double flaring tool and more particularly one in which the heretofore separate double flare forming parts are incorporated in a unitary structure.

Another object is to provide a tube working tool having a yoke, and means for forming an inwardly directed flare and means for forming an outwardly directed flare formed as an adapter member movably mounted on the yoke.

Another object is to provide a tube working tool in which the adapter is pivotally and slidably mounted on the yoke, pivotal movement of the adapter bringing a selected one of the flaring means into flaring postition, and sliding movement of the adapter on the yoke bringing the selected flaring means into engagement with the tube to perform a flaring operation.

A further object is to provide such a tool having means for clamping tubes of different sizes and having a plurality of first means of different sizes each for forming an inwardly directed flare and second means for forming an outwardly directed flare.

Other objects and advantages will be apparent from the following detailed description taken in connection with the accompanying drawings, in which:

Fig. 1 is a fragmentary side elevational view, partly in section, of the improved tool;

Fig. 2 is a top plan view of the tool of Fig. 1;

Fig. 3 is a vertical section of the yoke only along the line 3—3 of Fig. 1; and

Fig. 4 is a horizontal section along the line 4—4 of Fig. 3.

In systems or mechanisms wherein the thin-walled tubing is employed as, for example, in refrigeration controls, automotive, aircraft, etc., a piece of tubing is coupled to some device such as a coolant coil, a carburetor, or to another piece of tubing by means commonly referred to in the trade as a fitting. In order that the tubing may be securely held in the fitting in a fluid-tight relationship as well as to be restrained against pulling out of the fitting, the end of the tube is usually flared outwardly after one part of the fitting has been slipped over the tube.

Since the flared portion of the tubing is clamped between the parts of the fitting, it is the portion of the tube which is subject to the greatest stresses and it has been found desirable, therefore, both from the standpoint of mechanical strength and from the standpoint of facility of effecting a fluid-tight seal, to form what is known as a "double flare" on the end of the tube. By "double flare" is meant giving to the flared portion a double thickness by bending a portion of the tubing back upon itself. This is most expediently done by forming first an inwardly directed flare in the end of the tubing and then by forcing a conical flaring member into the open end of the tube to bend the inwardly directed flare back against the wall of the tubing and to form an outwardly directed flare of double thickness.

Referring now to the drawings, the complete tool comprises generally tube clamping means 7 and a yoke 8 carrying flaring means 9. The clamping means 7 constitutes no real part of the invention and may take any suitable form such as that disclosed and claimed in my application Serial No. 667,386 filed May 4, 1946, and issued April 25, 1950, as Patent No. 2,505,665, or the type herein shown comprising cooperating members in the form of elongated bars 10 and 11. In a tool of this character one bar, as the bar 10, preferably is made longer than the other bar to provide a convenient hand grip 10a. Conventionally, and as herein shown, the bar 10 has formed in one edge thereof a plurality (here shown as 5) of semicylindrical grooves or recesses 12 each of a different diameter so as to accommodate a tube of different outside diameter. Similarly, the bar 11 also has formed in one edge a like number of semicylindrical grooves or recesses 13 corresponding in diameter to the diameter of the adjacent grooves 12, and arranged in the same sequence so that the grooves of corresponding diameter will be disposed opposite each other when the bars 10 and 11 are positioned together as shown in Fig. 2 to form a plurality of means in the form of cylindrical openings for clamping tubes of different sizes.

Some convenient means is provided for drawing the bars 10 and 11 tightly together to clamp or grip a tube in the openings and to permit ready separation of the bars for insertion and subsequent withdrawal of a tube. By way of example, this means may take the form of a pair of bolts 14 and 15 pivotally connected one to each end of the bar 11. The bar 10 has a transverse bore 16 through which the bolt 14 passes, and at the end opposite the handle 10a the bar 10 and bar 11 are formed with a slot 17 opening through the end of the bars for reception of the bolt 15 by a swinging movement thereof. Both the bolt 14 and the bolt 15 carry wing nuts 14' and 15' respectively which may be readily tightened or loosened by the mechanic to firmly clamp the tube or to permit the bolt 15 to be swung out of the slot 17 and the bar 10 to be swung about the pivoted end of bolt 14 to open the bars for reception or removal of a tube.

The yoke 8 is adapted to be disposed astraddle the clamping means 7 during a flaring operation and is readily movable longitudinally of the clamping means so that it may be positioned over any selected one of the tube clamping openings. Herein the terminal ends of the legs of the yoke are shown formed with oblique grooves 18 in the inner surfaces providing triangular shoulders 19 for engaging both the under and the top surfaces of the bars 10 and 11 when the yoke in turn is positioned obliquely of the clamping means, the spacing between the legs of the yoke at the grooves 18 being sufficient to permit passage of the yoke over the clamping means when disposed at right angles thereto.

The multiplicity of and separate die-like elements usually required for the forming of a double flare on tubing of various sizes are here combined into a single unit with the unit in turn adapted to be carried by the yoke as a permanent and unitary part thereof. To that end, the various elements employed in double flaring tubing of various sizes are combined into a turret-like adapter member 21 rotatably as well as bodily movably mounted in the yoke 8 through the medium of split trunnions 22 which are slidable in an axial bore extending through the adapter. The trunnions are urged outwardly by a spring 23 as shown in Fig. 4 and project into slots 24 and 25 in opposite legs of the yoke, these slots forming oppositely facing trackways for slidable movement of the adapter 21 with respect to the yoke 8. After the adapter has been positioned in the yoke by insertion of the trunnions through the open outer ends of the slots 24 and 25, the ends of the slots are, as by swaging, closed sufficiently (see Fig. 3) to retain the adapter against loss out of the yoke.

The adapter has a polygonal peripheral surface, here shown as comprising six flat sides of varying surface area. Carried by the adapter are a plurality of first flaring means for forming an inwardly directed flare on the end of different size tubes and second flaring means for forming an outwardly directed flare on the end of said tubes, each side of the polygonal surface having one of said flaring means thereon. Each of the first flaring means comprises a conical well (the several wells being numbered 26a–26e) and a stud or pilot respectively numbered 27a–27e projecting from the bottom thereof. Each well and each stud is of a different size to cooperate with tubes of different diameters which may be clamped in the various openings in the body. The second flaring means comprises a conical projecting member 28 which extends from the remaining side of the polygonal surface of the adapter 21.

Means are provided for releasably holding the adapter against pivotal or rotational movement about the axis of the trunnions 22 and for moving the trunnions down along the trackways 24 and 25 to force a selected one of the flaring means against the end of a clamped tube. This means comprises a threaded stud 30 mounted in a cooperating threaded opening in the top of the yoke. A handle 31 is provided at the top of the stud for facilitating manual rotation thereof. At its bottom end the stud has an axial recess or well 32 at the bottom of which is seated a hardened loading disk 33 which forms a bearing for a ball 34 receivable in the recess. A pressure and guide member is provided, this member having a pressure head 35 and a stem 36 which extends into the recess 32 a considerable distance and bears against the ball 34. The stem is provided with an annular groove 37 and a pin 38 secures the pressure member to the stud 30, the pin and groove connection permitting rotational movement between the stud and the pressure member but preventing separation of these members. The underside of the head 35 is square with the stem 36 and is provided with a well 35a large enough for the reception of the largest one of the studs of the flaring means as shown in Fig. 3. It will be appreciated that the adapter 21 will be held against rotational tilting during a flaring operation by engagement of the underside of the head 35 with a side of the adapter, the head 35 being in turn made more stable by the close fit and substantial projection of the stem 36 into the recess 32 of the stud 30. The end faces 39 of the adapter are flat and have a sliding engagement with legs of the yoke to prevent lateral tilting of the adapter.

In the operation of the tool, after a tube has been clamped in one of the openings of the clamping means, the yoke is applied to the clamping means and positioned immediately over the end of the tube in the selected opening. If necessary, the stud 30 may then be retracted a sufficient distance to effect separation of the head and the adapter and to permit the adapter 21 to be rotated to position a selected one of the first flaring means immediately over the open end of the clamped tube. It should be noted that each of the five means which are provided to form an inwardly directed flare is adapted to cooperate with a different diameter tube, each of these flaring means being formed of a proper size to cooperate with a tube held in a different one of the openings in the clamping means. The stud 30 is then turned in to engage the adapter with a pilot received in the well 35a and the flat faces in contact thereby limiting rotational or pivotal movement of the adapter 21 so that the flaring means which cooperates with the clamped tube cannot turn out of position. Continued turning of the stud 30 slides the adapter 21 along the trackways to force the selected flaring means against the end of the clamped tube. With the parts in the position illustrated in Fig. 3 the projecting member or pilot 27b would enter the open end of the tube and the conical walled well 26b would form an inwardly directed flare on the tube. The stud is then backed off and the adapter rotated to position the second flaring means 28 over the tube. When the stud is again turned in, the conical surface of the member 28 will bend the inwardly directed flare in against the inner surface of the tube and will also form an outwardly directed flare as is well understood in the art. This flare, of course, will be of double thickness. The length of the pilots 27a–27e gives a measure of the distance the tube should project beyond the clamping means to make a proper double flare for the particular diameter tube.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A tube working tool comprising a yoke engageable with a tube clamping means, an adapter member having a plurality of diametrically opposed faces, means for pivotally and movably mounting said adapter in said yoke, tube flaring means on at least one of said faces and positionable with pivotal movement of the adapter adjacent the end of a tube held in the tube clamping means, and means on said yoke engageable with the face of the adapter opposed to the flaring means for moving said adapter to force said flaring means against the end of a clamped tube.

2. A tube working tool comprising a yoke adapted to be mountable on a tube clamping means astraddle thereof, an adapter member carried by said yoke and having a plurality of diametrically opposed flat faces, tube flaring means on each face, said [adapted] *adapter* being pivotally mounted in said yoke to permit a selected one of said flaring means to be positioned in operative relation to an end of a tube secured in the tube clamping means and also being slidable longitudinally of said yoke to permit the selected one of said flaring means to be forced against the tube to perform the flaring operation, and means on said yoke engageable with the face diametrically opposite the face carrying the last mentioned flaring means and operable to force the adapter toward the tube clamping means to perform the flaring operation.

3. A tube working tool comprising a yoke adapted to be mountable on a tube clamping means astraddle thereof, a turret-like adapter member carried in said yoke having a plurality of flat diametrically opposed faces, a tube flaring means carried on each of said faces and extending outwardly therefrom, said adapter being rotatably and bodily slidably mounted in said yoke to be positionable with a selected one of said flaring means in operative position relative to a tube and thereafter slidable longitudinally of said yoke to bring a selected flaring means into flaring engagement with a tube, a pressure transmitting member movably carried by the yoke and provided with a portion engageable with the face of the adapter member diametrically opposed to the face carrying said selected one of the flaring means, said pressure transmitting member having an opening positioned to receive thereinto the flaring means on the face engaged thereby, and a screw threadedly mounted in the apex of the yoke and positioned forceably to move the pressure transmitting member to force the selected flaring means into the end of a tube held in the clamping means with rotation of the screw.

4. In a tube working tool, a yoke having oppositely facing trackways therein and having means at its open end for engaging a tube clamping means, an adapter member, means for mounting said adapter on said yoke as an assembled part thereof, a plurality of tube flaring means mounted on said adapter, said adapter member being mounted for pivotal movement on spring loaded trunnions extending from opposite sides of said adapter and engaging said trackways to permit one or the other of said flaring means to be swung to operative position and to permit bodily sliding movement of the adapter member longitudinally of said yoke to force the selected flaring means into flaring engagement with a tube, and means on said yoke for forcing said adapter outwardly to perform a flaring operation.

*5. A flaring tool comprising a housing adapted to be positioned in predetermined working relation with a tube to be double flared, an operating member mounted for axial movement in said housing in coaxial relation with the working position of said tube, a carrier member in said housing, a plurality of double flaring punches supported in said carrier member and of graduated effective sizes for shaping the ends of tubes of correspondingly different sizes in preparation for double flaring, and means supporting said carrier member for movement in said housing to position a selected one of said punches in line with said operating member for operation thereby.*

*6. A flaring tool comprising a housing adapted to be positioned in predetermined working relation with a tube to be double flared, an operating member mounted for axial movement in said housing in coaxial relation with the working position of said tube, a carrier member in said housing, a plurality of double flaring punches supported in annular relationship by said carrier member and of graduated effective sizes for shaping the ends of tubes of correspondingly different sizes in preparation for double flaring, and means journalling said carrier member in said housing for rotation about the axis of the annular relationship of the punches to position a selected one of said punches in line with said operating member for operation thereby, said means maintaining the axis of the annular relationship of the punches perpendicular to a single fixed plane.*

*7. A flaring tool comprising a housing adapted to be positioned in predetermined working relation with a tube to be double flared, an operating member mounted in said housing for axial movement in coaxial relation with the working position of said tube, a carrier member in said housing, a plurality of double flaring punches supported in said carrier member and of graduated effective sizes for shaping the ends of tubes of correspondingly different sizes in preparation for double flaring, and means supporting said carrier member for movement in said housing to position a selected one of said punches in line with said operating member for operation thereby, the association of the operating member with the carrier member being such as to preclude rotation of the carrier member during operation of the punch.*

*8. A flaring tool comprising a housing adapted to be positioned in predetermined working relation with a tube to be double flared, an adapter member in said housing carrying a plurality of double flaring punches of graduated effective sizes for shaping the ends of tubes of correspondingly different sizes in preparation for double flaring and flaring means for effecting a double flare on a tube end shaped by a flaring punch, an operating member mounted for axial movement in said housing in coaxial relation with the working position of said tube and arranged for separable engagement with said adapter member, and means supporting said carrier member for movement in said housing to position successively a selected one of said punches and said flaring means in line with said operating member for operation thereby.*

References Cited in the file of this patent or the original patent

UNITED STATES PATENTS

| | | |
|---|---|---|
| 584,236 | Nichols | June 8, 1897 |
| 750,182 | Furbish | Jan. 19, 1904 |
| 910,789 | Cunningham | Jan. 26, 1909 |
| 1,024,728 | Jackson | Apr. 30, 1912 |
| 1,114,666 | Anderson | Oct. 20, 1914 |
| 2,117,543 | Corrigan | May 17, 1938 |
| 2,278,932 | Kellems | Apr. 7, 1942 |
| 2,317,099 | Groene | Apr. 20, 1943 |
| 2,370,089 | Swyers | Feb. 20, 1945 |
| 2,424,871 | Wenk | July 29, 1947 |
| 2,471,593 | Toye | May 31, 1949 |

FOREIGN PATENTS

| | | |
|---|---|---|
| 805,941 | France | Sept. 7, 1936 |